United States Patent [19]

Johnston

[11] 3,808,480
[45] Apr. 30, 1974

[54] CAPACITIVE PRESSURE TRANSDUCER
[75] Inventor: Samuel Andrew Johnston, Fontana, Wis.
[73] Assignee: Bunker Ramo Corporation, Oak Brook, Ill.
[22] Filed: Apr. 16, 1973
[21] Appl. No.: 351,664

[52] U.S. Cl................ 317/256, 73/398 C, 317/246
[51] Int. Cl............................................... H01g 7/00
[58] Field of Search............ 317/256, 246; 73/398 C

[56] References Cited
UNITED STATES PATENTS
| | | | |
|---|---|---|---|
| 2,573,870 | 10/1951 | Pfund................................ | 317/246 |
| 2,605,426 | 7/1952 | Martin.............................. | 317/246 X |
| 3,405,559 | 10/1958 | Moffatt............................ | 317/246 X |

*Primary Examiner*—E. A. Goldberg
*Attorney, Agent, or Firm*—F. M. Arbuckle; D. R. Bair

[57] ABSTRACT

Pressure responsive diaphragms, in their movement with respect to fixed plates, constitute variable capacitors. Dual diaphragms, on opposite sides of a substrate carrying the corresponding fixed plates, eliminate flexure of the substrate as a factor in the performance of the device. An electrical circuit for converting the varying capacitance to a correspondingly varying electrical signal is housed in the space between the diaphragms. The pressure transducer so formed is contained in a casing which communicates by tubing to any desired source of pressure; such pressure in the interior of the casing is imposed on the transducer. Terminals for external electrical connections are formed by screws which hold the casing members together, and which are electrically continuous with internal conductors.

18 Claims, 10 Drawing Figures

PATENTED APR 30 1974 3,808,480
SHEET 1 OF 2
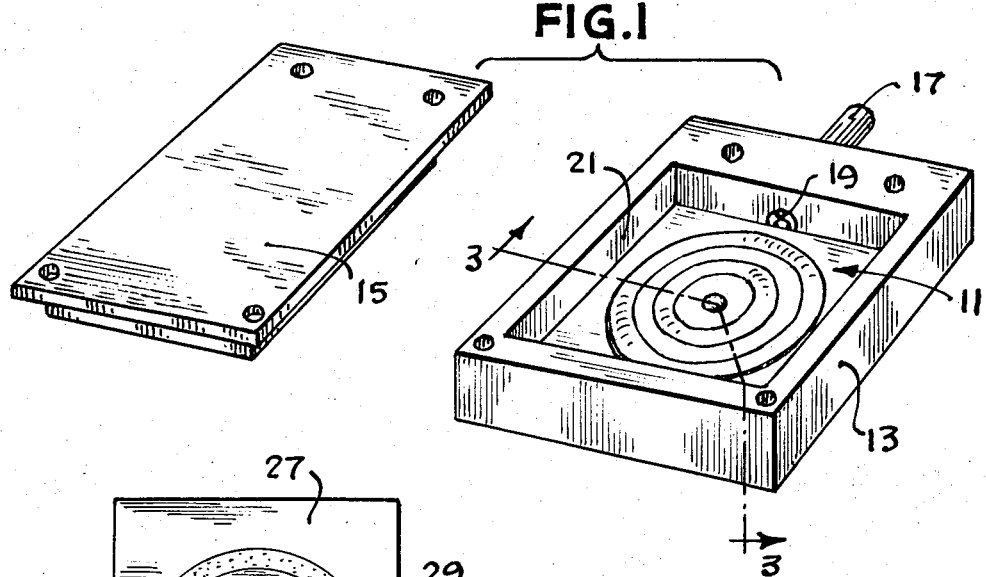
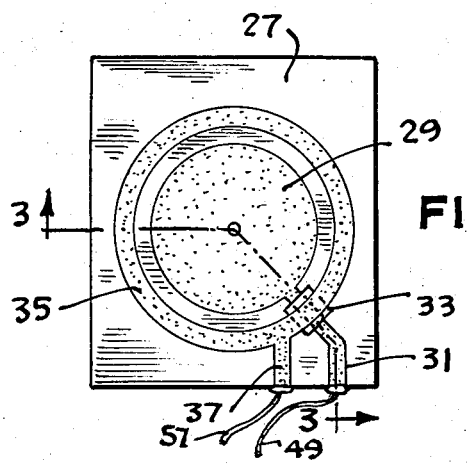
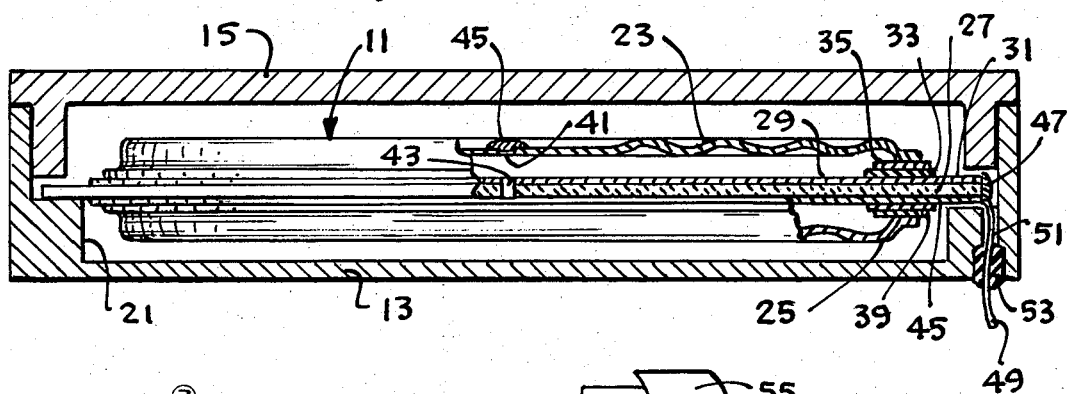
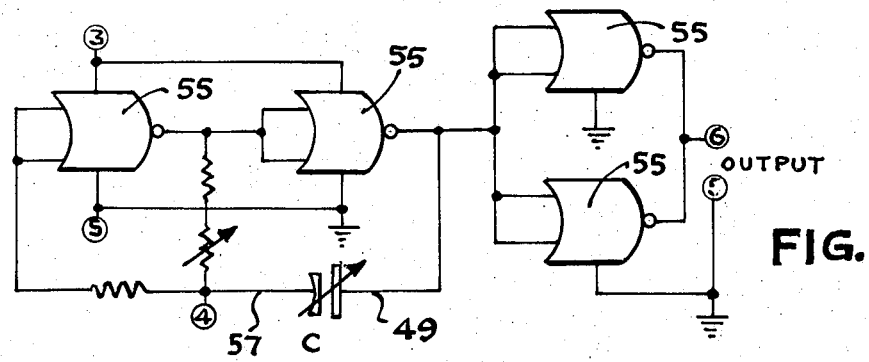

CAPACITIVE PRESSURE TRANSDUCER

BACKGROUND OF THE INVENTION

There are many types of situations in which it is desirable to sense pressure conditions, and to obtain electrical signals from some form of sensing device which have a rational and consistent relation to the magnitude of the pressure, or to changes therein. Systems are known in which variations in pressure are made to change the capacitance of a sensing device, ordinarily by making one of the plates of a capacitor a movable or flexible member, such as a diaphragm. If one side of the diaphragm is exposed to the pressure to be sensed, its flexure in response to varying pressure can be "read out" as a change in capacitance if the diaphragm is made one plate of a capacitor, and located closely adjacent to a second, fixed plate. Such a sensor is shown in U.S. Pat. No. 2,958,056, FIGS. 23 and 24.

By including the variable capacitor as part of an oscillator circuit, changes in pressure are indicated by changes in the operating frequency of the oscillator circuit. The variable frequency signal can be passed through a discriminator to obtain an analog output, or through a counter to obtain a digital output. Systems of this type are disclosed in U.S. Pat. Nos. 3,295,360 and 3,595,084.

The present invention is a refinement in systems of the kind described, by which important advantages are gained in manufacturing economy, in reduction of size and weight, and in isolation from electromagnetic interference.

BRIEF SUMMARY OF THE INVENTION

A dielectric substrate is provided with a "printed" central fixed electrode, and an annular electrode surrounding and insulated from it. A concave flexible pressure responsive diaphragm is hermetically sealed at its periphery to the annular electrode, and constitutes with the central electrode a variable capacitor. Circuitry for converting the varying capacitance to a correspondingly varying electrical signal is located in the space enclosed between the substrate and the diaphragm. Evacuation of that space provides a benign environment for the circuitry. Provision of a pair of diaphragms on opposite sides of the substrate eliminates stressing or flexing of the substrate as a factor in operation of the device. A composite laminar substrate provides conductors for the associated circuitry at the interface between the laminae, so that they are spaced from the electrodes or other conductors on the outer face of a lamina by the thickness of the lamina, thus minimizing stray capacitance between them. A casing surrounding the substrate and diaphragms provides means by which the diaphragms can be subjected to pressure conducted by suitable tubing from any desired pick-up location. Screws which hold the cover on the casing also pass through the margin of the substrate, at which point they can make contact with conductors on the substrate, so that the outer ends of the screws can be used for external wiring terminations.

DESCRIPTION OF THE DRAWINGS

FIG. 1 is an exploded perspective view of a pressure sensor embodying the invention;

FIG. 2 is a plan view of a part of the device of FIG. 1, showing the substrate and electrodes without the diaphragm in place;

FIG. 3 is a sectional view taken on the line 3—3 of FIGS. 1 and 2;

FIG. 4 is a schematic diagram of a circuit which can be employed with the variable capacitance sensor to obtain a variable frequency output;

Figure 5:
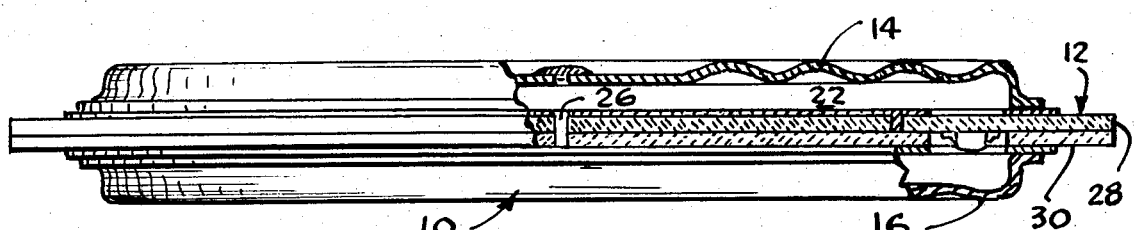
FIG. 5 is a side elevational view, partly in section, showing a pressure transducer in a form which includes a circuit such as that in FIG. 4 as a part of the device.
Figure 6:
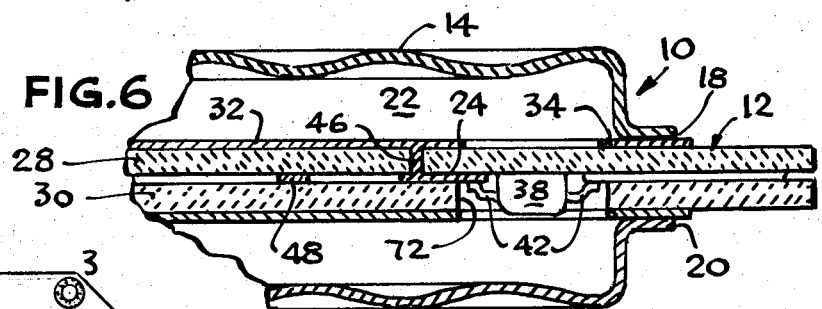
FIG. 6 is a fragmentary sectional view, on an enlarged scale, of a portion of the device shown in section in FIG. 5.
Figure 7:
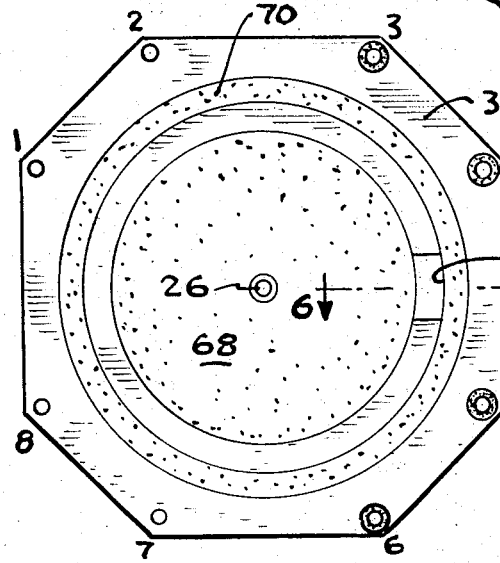
FIG. 7 is a plan view of one side of one of the substrate laminae.
Figure 8:
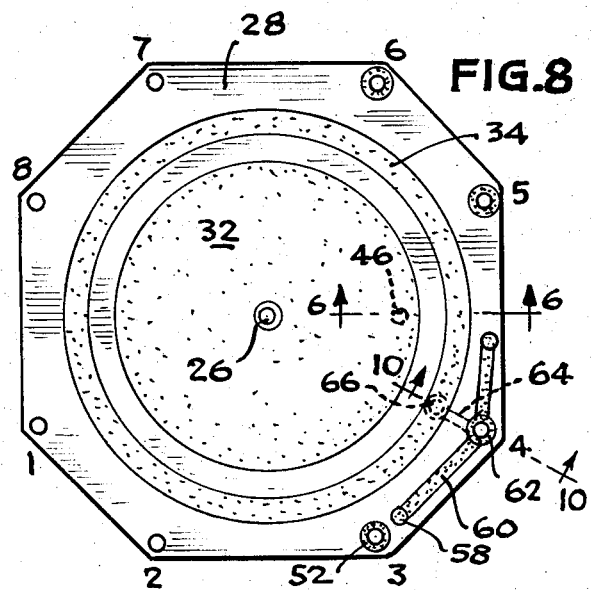
FIG. 8 is a plan view of one side of the other substrate lamina.
Figure 9:
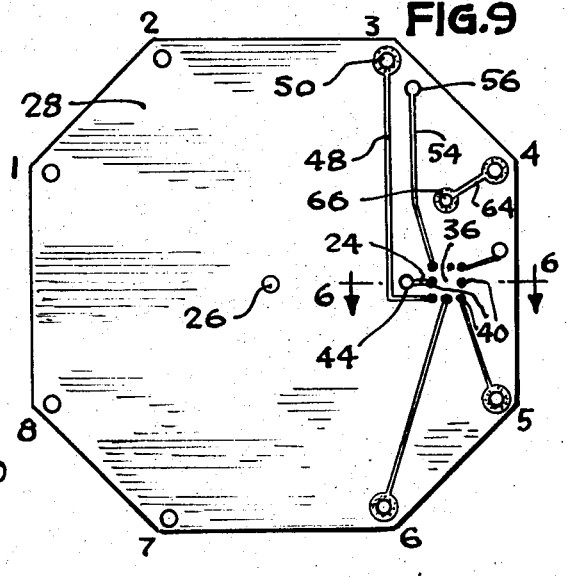
FIG. 9 is a plan view of the reverse side of the substrate lamina of FIG. 8.

Section lines marked 6—6 in FIGS. 7, 8 and 9 indicate the plane on which the sections in FIGS. 5 and 6 are taken.

For convenience in reference, corners of the laminae shown in FIGS. 7, 8 and 9 are numbered. Similarly numbered corners come together when the laminae are assembled.

DETAILED DESCRIPTION

The pressure sensor shown in FIG. 1 includes a capsule unit designated generally by the reference numeral 11, which is contained in a casing 13, for which a cover 15 is provided. A tube 17 communicates through an opening 19 with the cavity 21 in the casing 13 in which the capsule 11 is received. When assembly of the sensor is completed, the cover 15 is applied to the casing 13 with an appropriate sealant so that no leakage will occur between casing and cover.

The construction of capsule 11 is best seen in FIG. 3. It consists essentially of two flexible diaphragms 23 and 25, mounted on opposite faces of a substrate 27. The substrate 27 is preferably a dielectric material, and one which has been found suitable for this purpose is Alsimag 771, a high alumina ceramic material produced by American Lava Corporation. It has good electrical and mechanical properties, is impermeable to gases and to water vapor, and electrically conductive paths or lands may be readily adhered to the surface of a plate-like substrate made from it.

For the purposes of this invention, a land or conductor configuration such as that shown in FIG. 2 can be used. To constitute one plate of the variable capacitor, a fixed electrode comprising land area 29, with a conductive path or lead 31 extending to the edge of the substrate, is formed by depositing a suitable conductor composition in the desired configuration by screen process printing. A suitable composition for this purpose is DuPont Palladium/Silver Conductor Composition 9061, which after a few minutes drying can be fired at a peak temperature of 850°C to give a conductor which adheres firmly to the substrate, and is readily solderable.

To provide electrical isolation from the next conductor to be deposited, it is necessary to provide a dielectric layer 33 over the lead 31. This can be done by depositing by screen process printing a layer of a suitable composition such as DuPont 9101 Low K Dielectric which, like the conductive composition, is subsequently fired to fusion temperature.

An annular land area or electrode 35, with a lead 37, is then provided by similar methods, using the conductive composition. It will be noted that although this electrode crosses the lead 31, it is electrically isolated therefrom by the interposed dielectric layer 33, the separate layers being shown at the right in FIG. 3.

The diaphragm 23 is secured at its edge to the electrode 35 by solder (not shown), or by other appropriate means, such as an electrically conductive adhesive, which will provide satisfactory hermetic sealing and electrical continuity between the diaphragm and the electrode.

A suitable material for the diaphragm is Ni-Span-C Alloy 902 produced by Engelhard Industries, a division of Engelhard Minerals and Chemicals Corporation. This material has a temperature coefficient of expansion very similar to that of the ceramic substrate material previously mentioned, so that the bonds between the diaphragm, the substrate and the intermediate materials are subject to a minimum of stress in response to temperature changes. By appropriate heat treatment, it can be caused to have a very low thermoelastic coefficient of modulus of elasticity and the thermal coefficient of expansion. A low value of TEC is desirable to assure a reasonably constant calibration characteristic for the device, throughout a range of working temperatures.

On the face of the substrate 27 opposite to that shown in FIG. 2, a similar pattern of conductors and dielectric is provided, in mirror image, so that the leads will come out at corresponding points on the edge of the substrate. The diaphragm 25 is then attached to the annular electrode 39 in the manner described above.

One of the diaphragms has an opening 41 at its center, and the substrate has an opening 43 providing communication between the spaces enclosed by the diaphragms, assuring that the pressure will be equalized on the two sides of the substrate.

The assembly constituted by the substrate, the conductive patterns deposited thereon, and the diaphragms attached thereto, is referred to as a capsule, designated generally herein by the reference numeral 11. The capsule can be evacuated by placing it in a vacuum chamber, exhausting the chamber to the desired vacuum level, preferably in the 2–5 micron range, and while the vacuum is still maintained, closing off the opening 41 by solder 45.

It will be apparent that when the vacuum chamber is returned to room pressure conditions, the diaphragms will be deflected toward the substrate by atmospheric pressure; the size, shape and thickness of the diaphragm are chosen so that at atmospheric pressure a practical working distance remains between the elements of the capacitor, that is, for example, between the diaphragm 23 and the electrode 29. Using the Ni-Span-C Alloy 902 previously mentioned, with a thickness of 0.115 mm, in a conformation similar to that shown in FIG. 3 and a diameter of 41 mm, a clearance of about 1.25 mm exists between the diaphragm and the fixed electrode at atmospheric pressure, and this will permit use of the capsule at pressures up to about two atmospheres in the space surrounding the capsule, before its operating limit is reached due to mechanical and electrical contact being made between the diaphragm and its associated fixed electrode.

After the capsule has been evacuated, sealed and removed from the vacuum chamber, corresponding leads from the two sides of the plate, for example lead 31 from the fixed electrode on one side of the plate, and lead 45 from the fixed electrode on the other side of the plate (FIG. 3), are joined across the edge of the plate by solder 47, which also incorporates the end of a lead wire 49. When the capsule is assembled in the casing 13, the lead wire is extended through a hole 51 in the casing, the hole being hermetically sealed after assembly in an appropriate compound 53. In a similar manner, a lead wire 57 is brought out from lead 37 and its counterpart on the opposite side of the plate. The wires 49 and 57 are used for connection to an oscillator circuit.

An electronic circuit for use with such a pressure sensor is illustrated schematically in FIG. 4. The active components 55 are elements of a quad 2-input NOR gate such as that designated as 4001A and available from a number of manufacturers. This circuit provides a pulsed output, the pulse frequency varying with changes in the capacitance C. When the pressure sensor which has been described is connected into the circuit to constitute the capacitance C, the output of the circuit has a frequency related to the pressure to which the capsule is exposed. Such exposure would normally be accomplished by connecting the tube 17 by any suitable means to the source of the pressure to be measured.

It will be observed that where maximum economy is essential, it is possible to use only a single diaphragm and the necessary conductors on one side of the substrate. No hole 43 is then provided. Such a construction requires that the substrate 27 constitute one wall of the compartment enclosed by the diaphragm, and it must withstand the pressure outside the capsule, just as the diaphragm must. Consequently, flexure of the substrate enters into the variation of capacitance, and the mechanical properties of the ceramic are not as well known and controlled as they are for the Ni-Span-C Alloy materials.

When a symmetrical duplex diaphragm arrangement such as that illustrated in FIG. 3 is utilized, the pressure on both sides of the substrate is equalized by presence of the hole 43, and the properties of the substrate in flexure do not enter into the performance of the device to an important extent. Furthermore, there is no risk of damage to the brittle substrate by a pressure overload.

Another advantage of the duplex diaphragm construction is that the associated circuitry, such as that illustrated in FIG. 4, can be housed in the space enclosed by the diaphragms, being thus sealed against deterioration from exposure to external conditions, and being provided with a substantial degree of electrical shielding by the metallic enclosure constituted by the diaphragms.

FIG. 5 illustrates a pressure transducer 10 in which these advantages have been effectively utilized. It has a dielectric substrate indicated generally by the numeral 12, and flexible diaphragm members 14 and 16 which are hermetically sealed at their peripheries 18 and 20. The space 22 enclosed by the diaphragms may be evacuated and sealed off in the manner previously described, making the device responsive to pressure external to the diaphragms. This may be atmospheric pressure, or if the transducer 10 is enclosed in an external housing such as that provided by casing and cover, it would be responsive to the pressure within the housing.

A hole 26 is provided through the substrate, by which pressure within the diaphragms on the two sides of the substrate will be equalized.

Instead of a simple single ceramic plate substrate as previously described, it is advantageous to make the substrate 12 as a built-up or composite laminar assembly of two thin plates 28 and 30.

The side of plate 28 which faces the diaphragm 14 is referred to herein as the outside. This is the side which is uppermost in FIGS. 5 and 6; it is illustrated in FIG. 8. In a manner similar to what has been described, two major electrically conductive areas or lands are provided on the plate 28, a central electrode 32, and an annular electrode 34 which is spaced from and surrounds electrode 32.

The diaphragm 14 is hermetically sealed and electrically joined at its periphery 18 to the annular electrode 34. There is thus provided a variable capacitor consisting of fixed electrode 32, and diaphragm 14 (with electrode 34).

As previously mentioned, the variation in capacitance may be utilized to obtain an indication of the pressure to which the diaphragm is exposed, by incorporating the variable capacitance in a suitable circuit. The specific circuitry is not a part of this invention, but the invention does contemplate structural arrangements which make it feasible to include much of the necessary circuitry within the confines of the pressure sensor, so that a complete pressure transducer can be made in a very small, light and rugged configuration.

The outside of plate 28, as illustrated in FIG. 8, has been described. The reverse side of plate 28 can carry a pattern of conductors as may be appropriate for whatever circuitry is chosen to convert the changes in capacitance to a desired type of output signal. FIG. 9 illustrates a typical way in which such conductors can be arranged, the circuit being the one shown in FIG. 4.

An area 36 is provided for the mounting of an integrated circuit device 38 (seen in FIG. 6) which incorporates in a single package the four active elements 55 of FIG. 4. Terminal pads 40 surround the area 36, at points appropriate for connection to the leads 42 from the integrated circuit device 38. From the pads 40 the various conductors diverge to other connection points. For example, conductor 24 extends from a terminal pad 40 adjacent to the mounting area 36 to a point 44, where it extends through the plate 28 by way of a hole and conductor 46, known as a "via," and hence to a junction with electrode 32.

An important advantage of the composite substrate may be noted at this point. It will be understood that it is desirable to have a fixed capacitance of the sensor as small as practical relative to the variation in capacitance caused by the expected pressure changes. In the construction illustrated in FIGS. 2 and 3, there is a fixed capacitance between the annular electrode 35 and the lead 31 from electrode 29 at the point of crossing. This capacitance is of fairly large value, because the dielectric layer 33 cannot be very thick without creating a hump which interferes with the sealing of the diaphragm to electrode 35. In the composite substrate, on the other hand, the lead from the center electrode as seen in FIG. 6 is conductor 24, which does not come close to the annular electrode 34, thus avoiding an undesirable fixed capacitance. As to other conductors, their location on the opposite side of plate 28 from the electrodes 32 and 34 (and on the opposite sides of plate 30 from electrodes 68 and 70) is advantageous, because these plates are relatively thick compared to the dielectric layer 33, and stray capacitance is accordingly reduced.

Conductor 48 extends to a via 50 at corner 3, through which it extends to a terminal pad 52 on the opposite side, where an external connection to the transducer can be made. This is the point marked 3 in FIG. 4, one of the voltage supply terminals. Conductor 54 extends to a via 56, and through the substrate 28 to a terminal pad 58 on the opposite side, at one end of a resistive path 60 which extends to a terminal pad 62 at corner 4. This is the point marked 4 in FIG. 4. At corner 4 there is a via communicating from terminal pad 62 to conductor 64, which extends to a via 66, through which it joins with electrode 34 on the opposite side of the plate (see FIG. 8). Other aspects of the "wiring" will be apparent from the explanation of these examples.

The outside surface of plate 30, shown in FIG. 7, is similar to that of plate 28, in that it has a central electrode 68, and an annular electrode 70. These electrodes may be connected in any suitable way (not shown) to their counterparts 32 and 34, and a second diaphragm 16 is hermetically sealed at its periphery 20 to the electrode 70, as seen in FIG. 5.

Plate 30 is provided with an aperture 72 which provides a clearance and protective space for the integrated circuit 38, as may be seen in FIG. 6.

The two plates 28 and 30 are fused together in manufacture to constitute the substrate 12, and it will be apparent that a large part of the circuitry, i.e., that shown in FIG. 9, is thus protectively enclosed in the monolithic structure. The integrated circuit ship 38 is mounted, and its terminals 42 are attached to the pads 40. The diaphragms 14 and 16 are then assembled to the annular electrodes 34 and 70 by soldering or other suitable method, and the capsule is evacuated and sealed. When these operations have been accomplished, the integrated circuit device and most of the conductors are totally enclosed in an evacuated chamber, protected against dirt and moisture, against accidental abrasion, and shielded to a considerable extent against electromagnetic interference by the metallic diaphragms.

Resistive paths, such as 60, may be placed in exposed position on the outside of the structure so that their resistance values can be adjusted by abrading; if such tailoring is not necessary, they can be incorporated with the internal conductors of FIG. 9.

Figure 10:
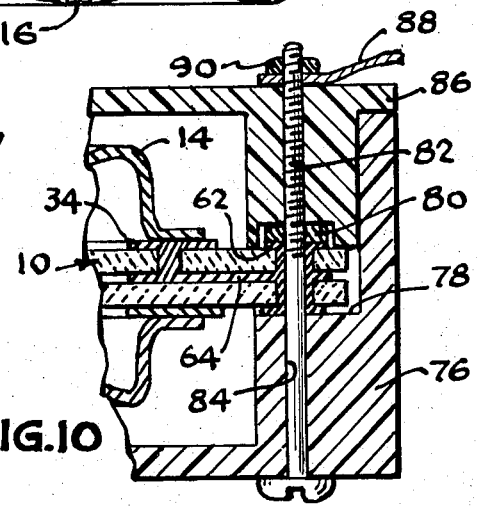
FIG. 10 is a fragmentary sectional view somewhat similar to FIG. 6, but taken on the line 10—10 of FIG. 8 and showing the substrate mounted in a casing, illustrating the manner in which external connections can be arranged.

The completed transducer 10 can be mounted in a casing 76 similar to that shown in FIG. 1, appropriately modified for the substrate shape. The casing is arranged so that its fastenings provide terminals for external wiring, as shown in FIG. 10, which is a section through corner 4 of the substrate 12. The edge of the substrate rests on a ledge 78 within the casing, and is held firmly against the ledge by a nut 80 on a screw 82 passing through the bottom of the casing 76 and through the hole 84. The bearing of the nut 80 against the terminal pad 62 in this case makes the screw 82 electrically common with the conductor 64, and hence with the annular electrode 34 and the diaphragm 14.

A similar arrangement may be used at each corner where an external connection is required — in this instance corners 3, 4, 5 and 6. At other corners, the substrate and the casing have holes for screws, but the screws passing through them do not serve as conductors for external electrical connections.

When the cover 86 is placed on the casing 76, connector terminals 88 are placed on those screws which serve as conductors for external connections, and are retained by nuts 90.

There is thus provided a neat and compact package in which a major portion of the circuitry is sealed for protection from environmental hazard. It can be economically manufactured and conveniently applied in many situations where controls are to be actuated by signals from pressure responsive tranducers.

The term capsule is used herein to refer to the subassembly which reacts to variations in pressure conditions by a change in capacitance. The term transducer is used to refer to a device incorporating a capsule, with the addition of circuitry translating the varying capacitance of the capsule to an electrical signal having characteristics consistently related to the magnitude of the capacitance.

The invention claimed is:

1. A variable capacitance pressure responsive device comprising
   a thin, flat, plate-like electrically nonconductive substrate having a supporting surface,
   a first electrode comprising a first electrically conductive film affixed to a portion of said supporting surface
   a second electrode comprising a second electrically conductive film hermetically affixed to said supporting surface and surrounding the periphery of but spaced apart and electrically isolated from said first electrode
   a thin flexible electrically conductive diaphragm hermetically sealed to and in electrical contact with said second film, said diaphragm being spaced from said first electrode, said first electrode and said diaphragm forming the plates of a capacitor,
   and means for providing a difference of pressure on opposite sides of said diaphragm.

2. A pressure responsive capsule comprising a plate-like substrate of electrically non-conductive material, electrodes laminated to opposite faces of said substrate, and a pair of electrically conductive diaphragms attached to opposite faces of said substrate, each enclosing at least one of said electrodes, but electrically insulated therefrom.

3. A pressure responsive capsule in accordance with claim 2, wherein a passage through said substrate is provided, permitting equalization of pressure between the spaces on opposite sides of said substrate enclosed by said diaphragms.

4. A pressure responsive capsule in accordance with claim 2, further including a lead extending from at least one of said electrodes to a point external to said diaphragms.

5. A pressure responsive capsule in accordance with claim 2, wherein the spaces enclosed by said diaphragms are evacuated and sealed.

6. A pressure transducer system including
   a plate-like substrate of electrically non-conductive material,
   electrodes attached to opposite faces of said substrate,
   a pair of electrically conductive diaphragms attached to opposite faces of said substrate, each enclosing at least one of said electrodes but insulated therefrom,
   the spaces enclosed by said diaphragms being at least partially evacuated and sealed, and said substrate having a passage therethrough communicating between said spaces and permitting equalization of pressure between said spaces,
   and an electrical circuit housed in said at least partially evacuated space, said circuit having input terminals connected to at least one of said electrodes and to at least one of said diaphragms, and being adapted to produce an output signal having a frequency varying in accordance with the capacitance presented to said input terminals.

7. A pressure transducer system including
   a plate-like substrate of electrically non-conductive material,
   electrodes attached to opposite faces of said substrate,
   a pair of electrically conductive diaphragms attached to opposite faces of said substrate, each enclosing at least one of said electrodes but insulated therefrom,
   the spaces enclosed by said diaphragms being at least partially evacuated and sealed, and said substrate having a passage therethrough communicating between said spaces and permitting equalization of pressure between said spaces,
   a closed casing surrounding said substrate and said diaphragms, said casing having means whereby its interior may be connected to a source of pressure to be sensed,
   and an electrical circuit housed in said at least partially evacuated space, said circuit having input terminals connected to at least one of said electrodes and to at least one of said diaphragms, and having output terminals, said circuit being adapted to produce a signal at said output terminals having a frequency varying in accordance with the capacitance presented to said input terminals.

8. A pressure transducer in accordance with claim 7, wherein said casing comprises parts which are maintained in assembled relation by a plurality of electrically conductive fasteners passing through said parts, at least one of said fasteners being then in electrical contact with one of said output terminals.

9. A pressure transducer comprising
   a platelike, electrically non-conductive substrate,
   a fixed electrode laminated to said substrate,
   a flexible, electrically conductive diaphragm enclosing said fixed electrode, but electrically insulated therefrom, and sealed to said substrate, the space between said diaphragm and said substrate being at least partially evacuated,
   a variable frequency oscillator mounted on said substrate in the space between said diaphragm and said substrate, said electrode and said diaphragm being connected to the input of said oscillator, whereby a change in capacitance between said electrode and said diaphragm varies the output frequency of said oscillator.

10. A pressure transducer system including
a plate-like substrate of electrically non-conductive material,
an electrode of circular outline attached to one face of said substrate,
an annular electrode attached to the same face of said substrate, surrounding and spaced from said circular electrode,
an electrically conductive diaphragm hermetically sealed to said annular electrode and spaced from said circular electrode,
the space between said diaphragm and said circular electrode being at least partially evacuated and sealed,
said substrate having a recess formed therein, in the space between said electrodes,
and an integrated electronic circuit device located in said recess, said device having input terminals connected to said electrodes, and having output terminals, and
hermetically sealed conductors from said output terminals to points on said substrate outside of said diaphragm.

11. A pressure transducer system comprising
a plate-like substrate of electrically non-conductive material,
a first electrical conductor constituting a fixed capacitor plate carried on said substrate,
an electrically conductive flexible diaphragm hermetically sealed to said substrate and constituting a variable capacitor plate,
an electronic circuit carried on said substrate, and having input and output terminals, said first electrical conductor and said diaphragm being connected to said input terminals,
an outer enclosure for said substrate and said diaphragm whereby the outside of said diaphragm is subjected to the pressure of whatever fluid may be contained in said enclosure,
said enclosure comprising parts which are maintained in assembled relation by a plurality of electrically conductive fasteners passing through said parts and through said substrate, at least one of said fasteners being in electrical contact with one of said output terminals.

12. A pressure transducer comprising in combination a plate-like ceramic substrate carrying on each face a conductor constituting a fixed capacitor plate, and
a flexible diaphragm hermetically sealed to the substrate and constituting a movable capacitor plate, an electrical circuit having input terminals and output terminals and including an integrated circuit device,
said substrate being comprised of at least two coterminous laminae,
one of said laminae having said integrated circuit device carried thereon,
the other of said laminae having an aperture therein providing a clearance space around said device, and
one of said laminae carrying conductors in the interface between said laminae, said conductors providing connections to and from said device, and including conductors from said fixed and movable capacitor plates to said input terminals.

13. A variable capacitance pressure transducer comprising:
 a. a support member having an electrically non-conductive gas impervious surface upon which a first and second electrode are supported;
 b. said second electrode surrounding the periphery of and spaced apart from said first electrode and hermetically sealed to said surface;
 c. a thin flexible electrically conductive diaphragm, impermeable to gas, electrically and hermetically attached to said second electrode and spaced apart therefrom, the surface of said support member and said diaphragm forming a hermetically closed chamber for maintaining a predetermined gas pressure; and
 d. an electrically conductive path extending from said first electrode, under said diaphragm and electrically insulated therefrom and from said second electrode, to a position on said support member beyond the outer extremity of said second electrode and said diaphragm, whereby ambient pressure acting upon the surface of said flexible diaphragm can be monitored by sensing the electrical capacitance between said electrically conductive path and said diaphragm.

14. Apparatus according to claim 13 wherein said path is insulated from said diaphragm and said second electrode by a dielectric material interposed between said path and an area under the outer extremity of said diaphragm path.

15. An apparatus according to claim 14 wherein the electrically capacitance between that portion of the electrical path which is in close juxtaposition to said diaphragm is relatively small compared to the electrical capacitance between said disphragm and said first electrode.

16. A variable capacitance pressure transducer comprising:
 a. a support member having an electrically non-conductive gas impervious surface upon which an electrode is supported;
 b. a thin flexible electrically conductive diaphragm impermeable to gas hermetically attached to said surface and spaced apart from said electrode, the surface of said support member and said diaphragm forming a hermetically closed chamber for maintaining a predetermined gas pressure; and
 c. an electrically conductive path extending from said electrode under said diaphragm and electrically insulated therefrom to a position on said support member beyond the outer extremity of said diaphragm, whereby ambient pressure acting upon the surface of said flexible diaphragm can be monitored by sensing the electrical capacitance between said electrically conductive path and said diaphragm.

17. An apparatus according to claim 16 wherein the electrical capacitance between that portion of the electrical path which is under and in close juxtaposition to said diaphragm is relatively small compared to the electrical capacitance between said diaphragm and said electrode.

18. A variable capacitance pressure transducer comprising:
   a. a laminated support member having two opposing electrically non-conductive gas impervious surfaces upon which a first and a second electrode are respectively supported in spaced apart opposing relationship to one another;
   b. first and a second thin flexible electrically conductive diaphragms impermeable to gas, each respectively hermetically attached to a different one of said surfaces and spaced apart from one of said electrodes, the surfaces of said support member and said diaphragms forming two hermetically closed chambers each maintaining a predetermined gas pressure; and
   c. electrically conductive paths extending from each electrode under its respective diaphragm and electrically insulated therefrom to a position on said support member beyond the outer extremity of said diaphragm, whereby ambient pressure acting upon the surface of said flexible diaphragm can be monitored by sensing the electrical capacitance between said electrically conductive paths and said diaphragms.

* * * * *

UNITED STATES PATENT OFFICE
CERTIFICATE OF CORRECTION

PATENT NO. : 3,808,480
DATED : April 30, 1974
INVENTOR(S) : Samuel Andrew Johnston It is certified that error appears in the above-identified patent and that said Letters Patent are hereby corrected as shown below:

Column 10, line 20, "therefrom" should read -from said first electrode-; line 38, cancel "path"; line 40, change "electrically" to -electrical-.

Signed and sealed this 15th day of July 1975.

(SEAL)
Attest:

RUTH C. MASON
Attesting Officer

C. MARSHALL DANN
Commissioner of Patents
and Trademarks